(12) United States Patent
Tsai

(10) Patent No.: US 7,968,835 B2
(45) Date of Patent: Jun. 28, 2011

(54) ELECTRONIC DEVICE HAVING LED WITH VARIABLE BRIGHTNESS

(75) Inventor: Leonard Tsai, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 11/796,668

(22) Filed: Apr. 27, 2007

(65) Prior Publication Data
US 2008/0265131 A1    Oct. 30, 2008

(51) Int. Cl.
*H03F 3/08* (2006.01)

(52) U.S. Cl. .............. 250/214 AL; 250/205; 250/206; 250/214 LA; 345/82

(58) Field of Classification Search ............ 250/214 LA, 250/214 AL, 205, 206; 340/815.45, 815.46; 315/293; 345/82
See application file for complete search history.

(56) References Cited

U.S. PATENT DOCUMENTS

| | | | | |
|---|---|---|---|---|
| 4,181,915 | A  * | 1/1980  | Lagoni ........................... | 348/570 |
| 6,466,826 | B1 * | 10/2002 | Nishihira et al. ................ | 700/17 |
| 6,980,119 | B2 * | 12/2005 | Toulmin et al. .......... | 340/815.45 |
| 7,109,876 | B2 * | 9/2006  | Smith et al. ................. | 340/636.1 |
| 7,236,154 | B1 * | 6/2007  | Kerr et al. ..................... | 345/102 |
| 2004/0000628 | A1 * | 1/2004 | Lin ................ | 250/205 |
| 2005/0036294 | A1 * | 2/2005 | McMahon ...................... | 362/23 |
| 2005/0190142 | A1 * | 9/2005 | Ferguson .................... | 345/102 |
| 2006/0082538 | A1 * | 4/2006 | Oyama ........................ | 345/102 |
| 2006/0092182 | A1 * | 5/2006 | Diefenbaugh et al. ........ | 345/690 |
| 2006/0220895 | A1 * | 10/2006 | Arcaria et al. ............. | 340/815.4 |
| 2006/0226790 | A1 * | 10/2006 | Prouse ......................... | 315/291 |
| 2006/0238531 | A1 * | 10/2006 | Wang ............................ | 345/211 |

FOREIGN PATENT DOCUMENTS

JP        2003098990 A    *    4/2003

* cited by examiner

*Primary Examiner* — Georgia Y Epps
*Assistant Examiner* — Kevin Wyatt

(57) ABSTRACT

Various embodiments of a light on an electronic device are disclosed. In one embodiment, the light couples to a sensor and has a brightness that varies when ambient light incident on the sensor varies.

20 Claims, 2 Drawing Sheets

ELECTRONIC DEVICE HAVING LED WITH VARIABLE BRIGHTNESS

BACKGROUND

Many computer and consumer electronic appliances include one or more light based indicators, such as light emitting diodes (LEDs). LED indicators have high brightness, long life spans, and low power consumption and can be readily adapted to emit colored light. Current design trends prefer to use colored LEDs with high intensity to enhance visual effects of the electronic appliance.

LEDs are often quite bright in normal room lighting conditions in order to provide a recognizable visual indication. The light from LEDs, however, can be annoying or distracting after a user turns off the room light or the ambient light is otherwise gone.

DETAILED DESCRIPTION

Exemplary embodiments are directed to apparatus, systems, and methods for adjusting light emitted from light indicators on electronic devices. One embodiment provides automatic ambient light adaptation control to light indicators used in electronic devices.

In one embodiment, intensity of the light indicator is adjusted accorded to variations in ambient light. By way of example, when a room light is on, output from the light indicator has a relatively high brightness. When the room light is turned off, the output from the light indicator is reduced to a more soothing lower intensity.

One embodiment uses an ambient light sensor to control the brightness of the light indicator. As ambient light increases or decreases, the brightness of the light indicator automatically increases or decreases based on the level of ambient light. One method automatically adjusts an indicator light output level based on sensed ambient light intensity.

Figure 1:
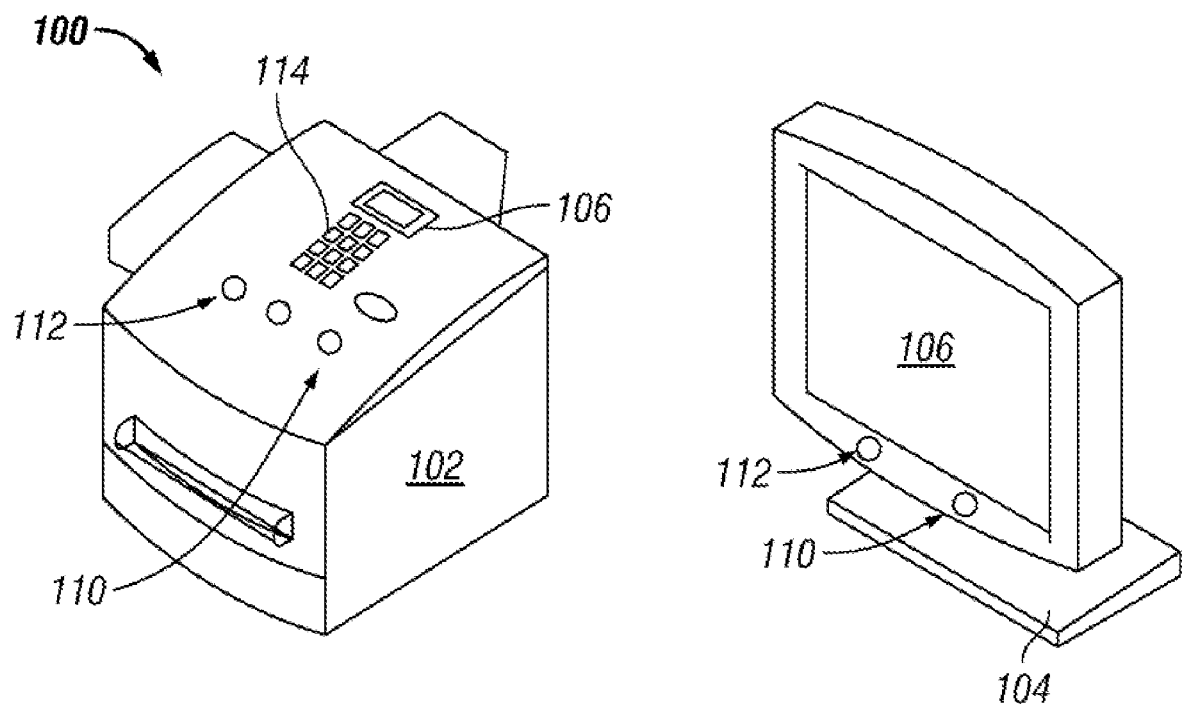
FIG. 1 is a perspective view of electronic devices using light indicators according to one exemplary embodiment.

Exemplary embodiments include a variety of electronic components, devices, and equipment. FIG. 1 is a perspective view of electronic devices 100 using light indicators according to one exemplary embodiment. By way of illustration, FIG. 1 shows a first electronic device 102 (such as a printer, copier, facsimile, multifunctional device, consumer electronic device, etc.) and a second electronic device 104 (such as a television, computer, display, etc.).

Electronic devices 102 and 104 include a GUI (graphical user interface) or display 106, one or more light indicators 110, and one or more sensors 112. For illustration, electronic device 102 also includes a data entry device 114 (such as a keypad).

In one embodiment, the light indicators 110 include one or more LEDs to provide a visual indication on the electronic device that a function of the electronic device is active or available. By way of example, the LEDs are provided as accent lighting on an external surface to indicate a particular component, function, or feature of the electronic device (such as a power-on indication or function enabled).

In one embodiment, the sensors include one or more photosensors or photodetectors for sensing light or other electromagnetic energy. By way of example, the sensors include various optical detectors such as, but not limited to, photoresistors, photodiodes, phototransistors, photovoltaic cells, etc.

Figure 2:
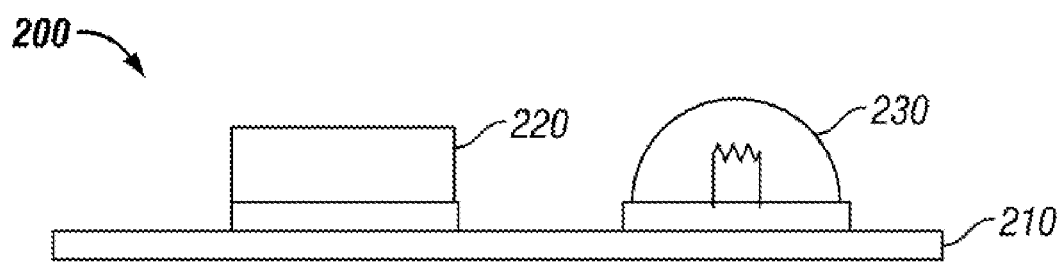
FIG. 2 is a side view of a system according to one exemplary embodiment.

FIG. 2 is a side view of a system 200 according to one exemplary embodiment. The system includes a printed circuit board (PCB) 210, photosensor 220, and light indicator 230. The photosensor and light indicator are electrically coupled together through one or more conductive paths or traces (not shown).

Figure 3:
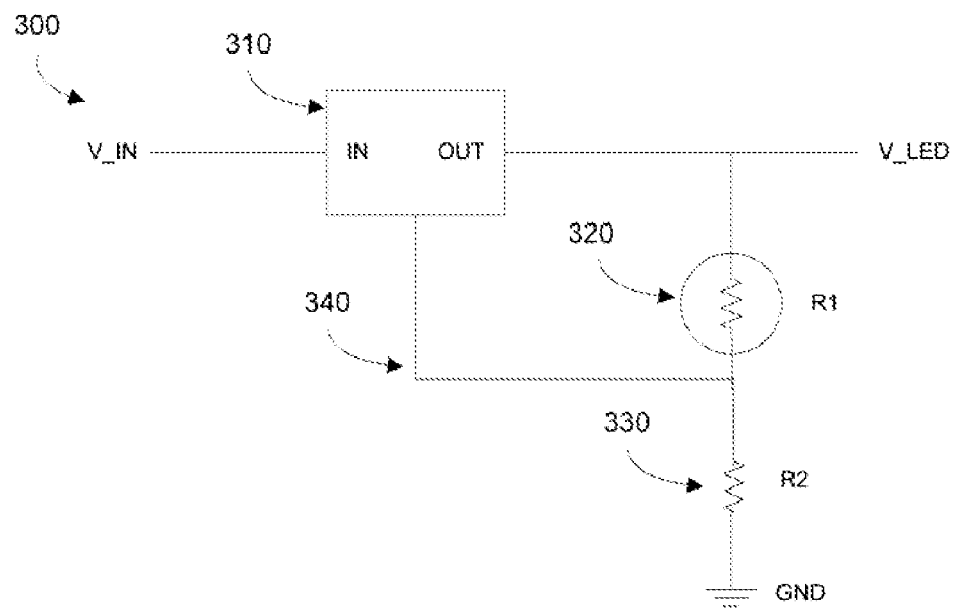
FIG. 3 is a circuit according to one exemplary embodiment.

FIG. 3 is a circuit 300 according to one exemplary embodiment. By way of example, the circuit 300 includes a voltage regulator 310, photosensor 320, and resistor 330. The voltage regulator 310 has a V_IN, V_OUT, and a connection 340 split between photosensor 320 and resistor 330 to adjust voltage at V_LED in response to light detected at the photosensor 320.

The voltage regulator 310 has an adjustable input control. The input control is connected to the photosensor 320 with a bias offset predetermined to achieve preferred range of indicator light output. In one embodiment, the output voltage (V_OUT) of the voltage regulator 310 is determined by a ratio of the resistance of R1 and R2. If R1 represents resistance of the photosensor 320, then its resistance decreases with higher ambient light input. Thus when the ambient light is brighter, the output voltage to the light indicator rises. By contrast, when the ambient light is lower or off, the output voltage to the light indicator lowers. Thus, the output voltage to the light indicator varies according to the intensity of light incident on and sensed by the photosensor 320. As the ambient light decreases, the brightness of the light indicator decreases. As the ambient light increases, the brightness of the light indicator increases.

In one embodiment, the output voltage (V_OUT) is determined by the following equation:

$$V\_OUT = 1.25V * (1 + R2/R1).$$

Figure 4:
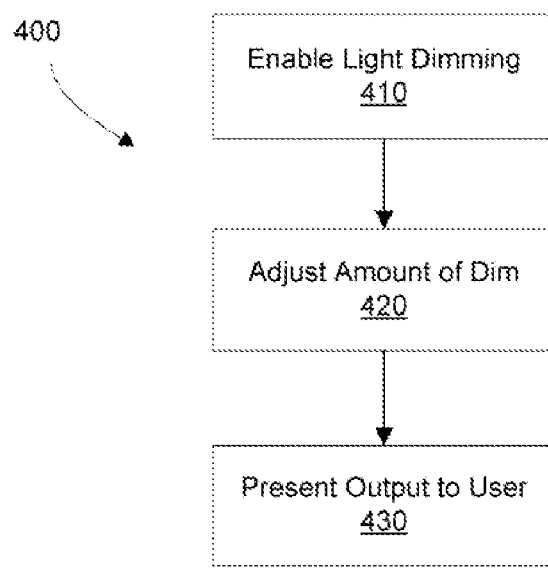
FIG. 4 is a flow diagram for adjusting a light indicator according to one exemplary embodiment.

FIG. 4 is a flow diagram 400 for adjusting a light indicator according to one exemplary embodiment. In this embodiment, a user is able to adjust settings to control brightness or intensity of light output by the light indicator for given amounts of ambient light.

According to block 410, light dimming is enabled. In one embodiment, a user selects between one of two modes: dimming being enabled (i.e., dimming function "on") and dimming being disabled (i.e., dimming function "off"). While the dimming function is enabled, variations in light intensity incident on the photosensor result in variations of brightness output by the light indicator. While the dimming function is disabled, variations in light intensity incident on the photosensor result in no variations in output by the light indicator. In the latter instance, the light indicator provides a constant brightness regardless of ambient light when power to the light indicator is on.

According to block 420, a user adjusts the amount of dim that the light indicator exhibits. In one embodiment, the user manually adjusts V_OUT through interaction with the electronic device having the light indicator or with a computer in communication with the electronic device.

In one exemplary embodiment, a user interacts with a display, GUI, and/or input device (example, keyboard, mouse, pointer, keypad, etc.) to enable or disable dimming and to adjust brightness of the light indicator in response to variations in ambient light. By way of example, such adjustments can occur through one or more of user interaction with a display menu providing different brightness levels to the user. For instance, while the electronic device is in a dim or dark room, a user decreases the brightness output by the light indicator.

The amount of dim is presented using, by way of example but not limited to, a pull down menu (example, a menu appearing on a display of the electronic device), a slide bar, a numeric level indicator (example, user selectable levels of brightness from 1 to 5), and any output using a graphical illustration. By way of further example, a user interacts with hardware and/or software to enable and disable dimming and/or adjust brightness. For instance, a user activates an electronic or physical switch or button located on or associated with the electronic device having the light indicator.

In one embodiment, the amount of dim is presented to the user in real-time as the user selects the amount of dim during interaction with the electronic device. For instance, as the user selects a different level of dim, the brightness exhibited by the light indicator automatically changes so the user can preview the amount of dim that will occur.

According to block 430, the user is presented with output upon enabling/disabling dimming and/or adjusting brightness. By way of example, this output includes, but is not limited to, an audible indication (example, a sound presented to the user) and/or a visual indication (example, a display feature provides a visual indication that the brightness adjustment function is activated). In one embodiment, the visual indication is presented on a display while the brightness reduction mode is enabled.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments are provided as examples and should not be construed to limit other embodiments. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the exemplary embodiments. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit embodiments.

Various embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, firmware, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments. Numerous variations and modifications will become apparent to those skilled in the art once the above disclosure is fully appreciated. It is intended that the following claims be interpreted to embrace all such variations and modifications.

What is claimed is:

1. An electronic device, comprising:
   a photosensor; and
   an indicator light coupled to the photosensor and having a brightness that varies when ambient light incident on the photosensor varies, wherein the brightness exhibited by the indicator light changes in real-time as
   a user interacts with the electronic device to adjust the brightness so the user can preview an amount of brightness that will occur when variations of brightness of the ambient light are incident on the photosensor, and the indicator light is on an external surface of the electronic device and provides accent lighting that indicates when a function of the electronic device is available.

2. The electronic device of claim 1, wherein the indicator light is a light emitting diode (LED) that illuminates while the function of the electronic device is active.

3. The electronic device of claim 1, wherein the indicator light provides a visual indication of power being on at the electronic device.

4. The electronic device of claim 1 further comprising, a graphical user interface (GUI) for receiving input from the user to adjust the amount of brightness output by the light.

5. The electronic device of claim 1, wherein the photosensor includes one of a photoresistor, a photodiode, or a phototransistor.

6. The electronic device of claim 1 further comprising, a circuit having a voltage regulator that controls brightness of the light.

7. The electronic device of claim 1, wherein the electronic device includes one of a computer, a printer, a copier, or a television.

8. A method, comprising:
   automatically dimming brightness of a light emitting diode (LED) on an electronic device when ambient light incident on the electronic device decreases; and
   changing the brightness of the LED in real-time in response to a user interacting with the electronic device to adjust the brightness so the user can preview an amount of brightness that will occur when variations of brightness of the ambient light are incident on the electronic device, wherein the LED is on an external surface of the electronic device and provides accent lighting to indicate that a function of the electronic device is active or available.

9. The method of claim 8 further comprising, automatically increasing brightness of the LED when ambient light incident on the electronic device increases.

10. The method of claim 8 further comprising, varying the brightness of the LED based on an amount of light incident on the electronic device.

11. The method of claim 8 further comprising, providing an audible indication when automatic dimming of the LED is enabled.

12. The method of claim 8 further comprising, providing a visual indication while automatic dimming of the LED is enabled.

13. The method of claim 8, wherein the user interacts with the electronic device through a graphical user interface (GUI) to adjust the brightness.

14. A computer readable medium having instructions for causing an electronic device to execute a method, comprising:
   receiving input from a user to adjust brightness of a light emitting diode (LED) that is on an exterior surface of an electronic device when light incident on a sensor on the electronic device varies;
   adjusting the brightness in real-time in response to the input so the user can preview an amount of brightness that will occur from the LED when variations of brightness of ambient light are incident on the electronic device; and
   illuminating the LED to provide accent lighting that indicates a function of the electronic device is active or available.

15. The computer readable medium of claim 14 further comprising, presenting the user with a numeric level indicator to indicate the amount of brightness selectable by the user.

16. The computer readable medium of claim 14 further comprising:
   presenting the user with different levels of brightness for the LED;
   receiving the input through a graphical user interface (GUI) to select one of the different levels.

17. The computer readable medium of claim 14 further comprising:
   receiving input from the user to enable a brightness reduction mode of the LED;
   providing a visual indication on a display of the electronic device to indicate when the brightness reduction mode is enabled.

18. The computer readable medium of claim 14 further comprising, automatically decreasing brightness of the LED as brightness of the light incident on the sensor decreases.

19. The computer readable medium of claim 14 further comprising, automatically increasing brightness of the LED as brightness of the light incident on the sensor increases.

20. The computer readable medium of claim 14, wherein the electronic device is one of computer, a printer, a copier, or a television, and the sensor is one of a photoresistor, a photodiode, or a phototransistor.

* * * * *